R. T. MATHESON.
COAT COLLAR.
APPLICATION FILED DEC. 22, 1909.
962,403.
Patented June 21, 1910.
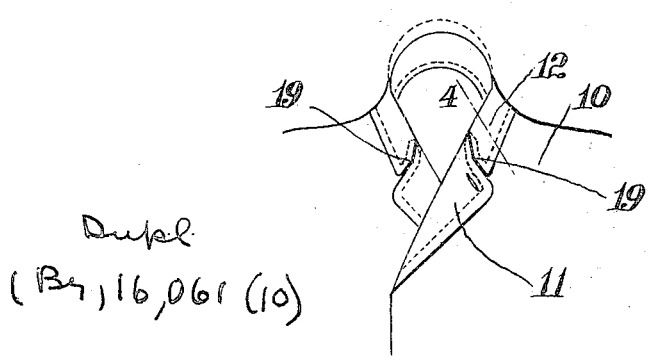
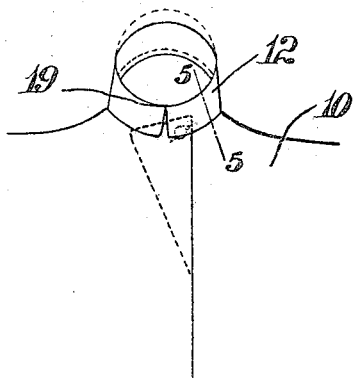
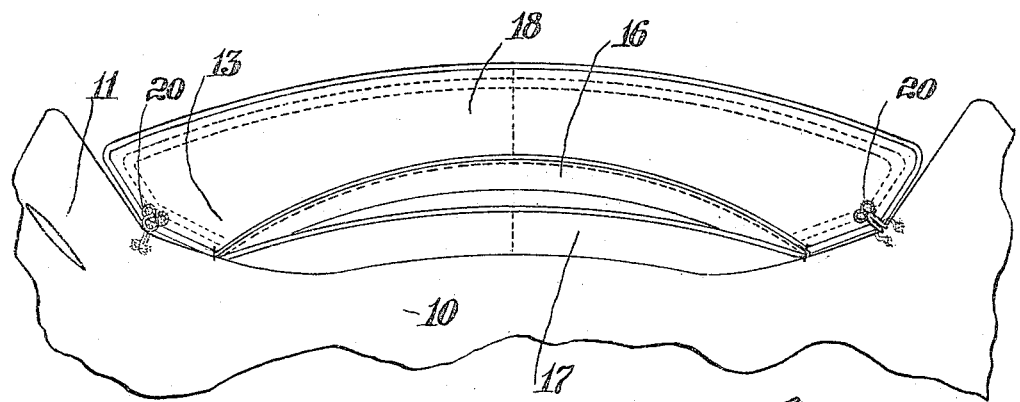
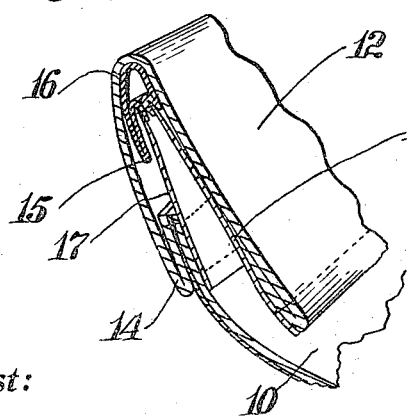
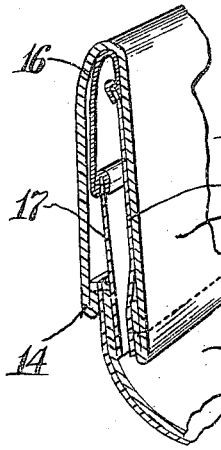
Attest:
Richard T. Matheson, Inventor:
by Wm. B. Whitney, Atty

UNITED STATES PATENT OFFICE.

RICHARD T. MATHESON, OF NEW YORK, N. Y., ASSIGNOR TO WILLIAM E. WOLFF, OF NEW YORK, N. Y.

COAT-COLLAR.

962,403.　　　　Specification of Letters Patent.　　Patented June 21, 1910.

Application filed December 22, 1909. Serial No. 534,442.

*To all whom it may concern:*

Be it known that I, RICHARD T. MATHESON, a citizen of the United States, and a resident of the borough of Brooklyn, city of New York, in the county of Kings and State of New York, have invented certain new and useful Improvements in Coat-Collars, of which the following is a specification.

My present invention relates to collars for overcoats, rain-coats, and similar garments for men and women; and, more particularly, to a combination collar which can be worn, without reversal, either as an ordinary turn-down collar or as a so-called military collar.

The objects of the invention, among others, are to provide a collar which, when worn as a turn-down collar, will give the coat an appearance differing scarcely perceptibly from that of an ordinary coat, which may be raised in front and brought together in the style of a military collar with an easy fit and without changing the line of its fold at the back, and which, whether worn as a turn-down or military collar, may be raised and lowered in the back still without changing the line of fold.

With these objects in view the invention consists in the construction, arrangement and combination of parts hereinafter described and claimed, and illustrated in the accompanying drawings in which—

Figure 1 is a front view of the upper part of a coat provided with my improved collar and showing the same as it appears when the collar is worn as an ordinary turn-down collar; Fig. 2, a similar view showing the coat as it appears, or may appear, when the front ends of the collar are raised and fastened together in front as a military collar; Fig. 3, an inside view, on a larger scale, of the neck of the coat and the upper ends of the lapels with the collar turned up and drawn away from the coat to show the different parts of the under collar; Fig. 4, an enlarged section on the line 4 4 of Fig. 1; and Fig. 5, an enlarged section on the line 5 5 of Fig. 2.

Similar reference characters indicate like parts in the several figures.

As here illustrated, the coat 10 is provided in front with the usual lapels 11 and with a collar comprising as usual an outer collar 12 and an under collar 13, which, however, present several novel features of construction. The collar is sewed to the neck of the coat out to the line of fold of the lapels on either side, the outer collar on the inside and the under collar on the back of the coat as usual, and is folded in the usual manner. An expansible bellows-fold 14, formed in the outer collar intermediate the lines of its fold and attachment to the coat, preferably close to and lapping down below the neck of the coat, extends from one lapel to the other and, with tapering ends, has a substantially crescent shape. The under collar is provided with a corresponding bellows-fold 15, preferably, however, by dividing the under collar, on a line which follows closely but is slightly below the line of the fold of the collar, into two parts and finishing and uniting together the adjacent edges of these parts by a strip of lining or other suitable material 16 in which the bellows-fold is formed; the lower or inner part 17, which is not sewed to the outer collar, serving to hold the latter up around the neck, while the outer and larger part 18 serves to stiffen the outer collar and is sewed around its edges thereto. The ends of the collar, and preferably also the abutting but free or disconnected upper ends of the lapels, extend downwardly and outwardly on the usual lines, which are substantially a continuation of the neck-line of the coat, from the fold of the lapels to points 19, sufficiently distant to enable the ends of the collar when raised to and folded at these points to be brought together and suitably fastened in front, as by hook and eye 20 attached to the under collar, and thence extend outwardly, at an angle with said neck-line, on lines which will become substantially vertical when the collar is thus raised in front and worn as a military collar (see Fig. 2). As thus constructed, a very satisfactory coat can be made from cloth either of a heavy or light weight and of any weave. The shape of the collar and lapels gives to it the appearance of an ordinary coat, when the collar is worn as a turn-down collar. When the ends of the collar are raised and are brought together in the style of the military collar, without turning up or reversing the collar, the bellows-folds will be straightened out at their ends (Fig. 5) and thus permit the collar to fold easily in front on new lines which will run back to and merge at the sides in the old line of fold, without raising the collar or raising or changing its fold around the back of the neck. And in either case, whether worn as a turn-down or military collar, the collar can, if desired, be raised up at the sides and back of the neck (see dotted lines, Figs. 1 and 2), without changing the line of fold, by merely drawing out the bellows-folds throughout their entire length.

While I have shown and described above what I now regard as the best form for the embodiment of my invention, it will be understood that it can be variously modified, within the scope of the appended claims, as by changing the form and arrangement of the parts or by substituting equivalents therefor, or by omitting some of the parts entirely, without departing from the spirit or sacrificing the advantages thereof.

What I claim as new, and desire to secure by Letters Patent, is—

1. A coat provided with a turn-down collar having a substantially crescent-shaped expansible longitudinal fold formed therein intermediate the line of its fold and of its attachment to the coat, whereby said collar may be raised and lowered at the back and sides without changing the line of fold.

2. A coat having a turn-down collar which is secured along its inner edge to the neck of the coat and has an expansible longitudinal fold formed both in the outer and under collar intermediate its line of attachment to the neck of the coat and its line of fold and extending along the sides and around the back of the neck.

3. A coat provided with a two-ply turn-down collar, the ply which constitutes the outer collar comprising a single piece of material secured at its inner edge to the neck of the coat and having a longitudinal expansible fold formed therein intermediate its line of fold and its inner edge and the ply which constitutes the under collar comprising two pieces divided and loosely connected together on a line which substantially follows and is slightly below the line of fold of the collar and secured at its inner edge to the neck of the coat and around its outer edges to the ply which constitutes the outer collar.

4. A coat provided with a two-ply turn-down collar, the ply which constitutes the outer collar being secured at its inner edge to the neck of the coat and having a longitudinal expansible fold substantially following and normally extending below its inner edge, the ply which constitutes the under collar being divided on substantially the line of fold of the collar into two pieces which are connected by a strip of material with a longitudinal expansible fold therein and having the inner lower piece secured at its lower edge to the neck of the coat and the larger outer piece to the ply which constitutes the outer collar.

5. A coat provided with lapels and a turn-down collar, which collar forms with the lapel on each side a notch extending back to the line of fold of the lapel and on each side is secured to the neck of the coat fixedly at substantially the line of fold of the lapels and yieldingly from near said line of fold back along the sides of the neck by means of expansible folds formed in each of the one or more plies of which said collar is constituted.

6. A coat provided with a turn-down collar, comprising an outer and under collar, which is attached to the coat between the lines of fold of the lapels, terminates in free ends forming on each side a notch extending back to the line of fold of the lapel, and along the sides of the neck has expansible longitudinal folds formed both in the outer and under collar intermediate the line of fold of the collar and of its attachment to the coat, said expansible folds being tapered toward the front and coming to an end on each side substantially at the line of fold of the lapel.

7. A coat provided with a turn-down collar secured to the neck thereof, which collar comprises an outer and under collar having bellows-folds formed both in the outer and under collar intermediate the line of fold of the collar and of its attachment to the coat and terminates in ends which are not secured to the lapels and extend first downwardly and outwardly on lines substantially a continuation of the neck-line of the coat from the fold of the lapels to points which, when the front of the collar is raised and folded thereto, will meet around the neck in front and thence extend outwardly at an angle with said neck-line.

In testimony whereof I have signed my name in the presence of two witnesses.

RICHARD T. MATHESON.

Witnesses:
  HOWARD F. PRETZFELD,
  JOHN J. RIORDAN.